May 3, 1927.                  E. W. SAUNDERS                  1,626,758
                                WINDSHIELD
                            Filed Dec. 15, 1924          2 Sheets-Sheet 1

INVENTOR
Edward W. Saunders.
BY Bakewell & Church
ATTORNEYS

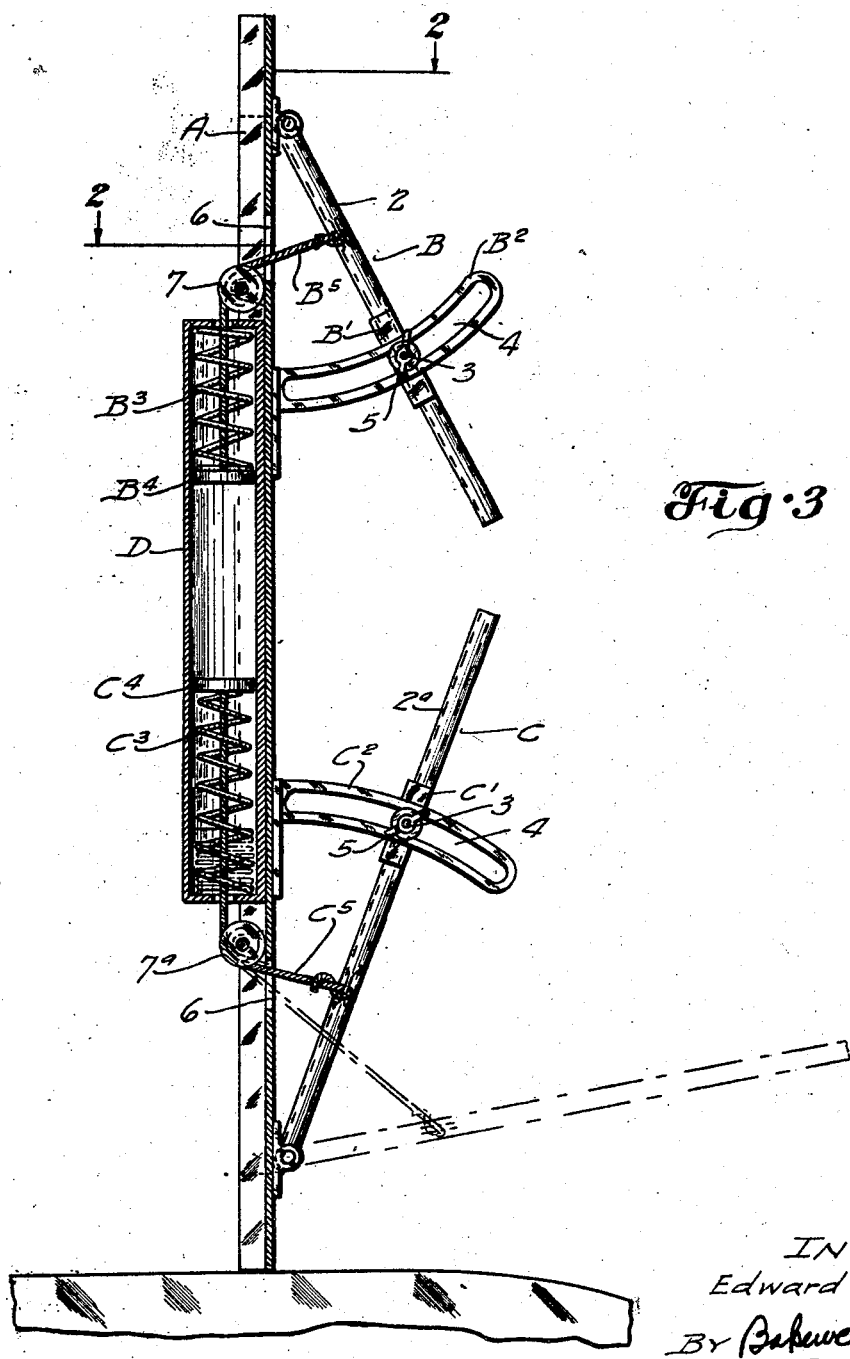

Patented May 3, 1927.

1,626,758

UNITED STATES PATENT OFFICE.

EDWARD W. SAUNDERS, OF ST. LOUIS, MISSOURI.

WINDSHIELD.

Application filed December 15, 1924. Serial No. 755,977.

This invention relates to wind shields of the type that comprise a protecting member arranged in front of a person so as to protect said person from wind, rain, snow or the like. In the conventional wind shields that are used on vehicles the protecting means of the shield is formed by one or more glass panels mounted on a supporting structure in such a way that said panel or panels are normally set in a rigid position. Consequently, in the event of an accident which causes an occupant of the vehicle to be thrown forwardly against the glass protecting means of the shield there is great danger of said means being shattered, thus causing injury to the occupants of the vehicle.

The main object of my invention is to provide a wind shield in which the protecting means of the shield is so constructed and arranged that it is capable of moving forwardly freely in the event a person located behind said means is thrown forwardly against same, thereby preventing damage to the protecting means of the shield or injury to the person thrown forwardly against said means.

Another object is to provide a wind shield, which, in addition to having the desirable characteristic above pointed out, is so constructed that the protecting means of the shield can be adjusted easily to form a clear vision slot in same through which persons located behind the shield have an unobstructed view in inclement weather. Other objects and desirable features of my invention will be hereinafter pointed out.

Figure 1:
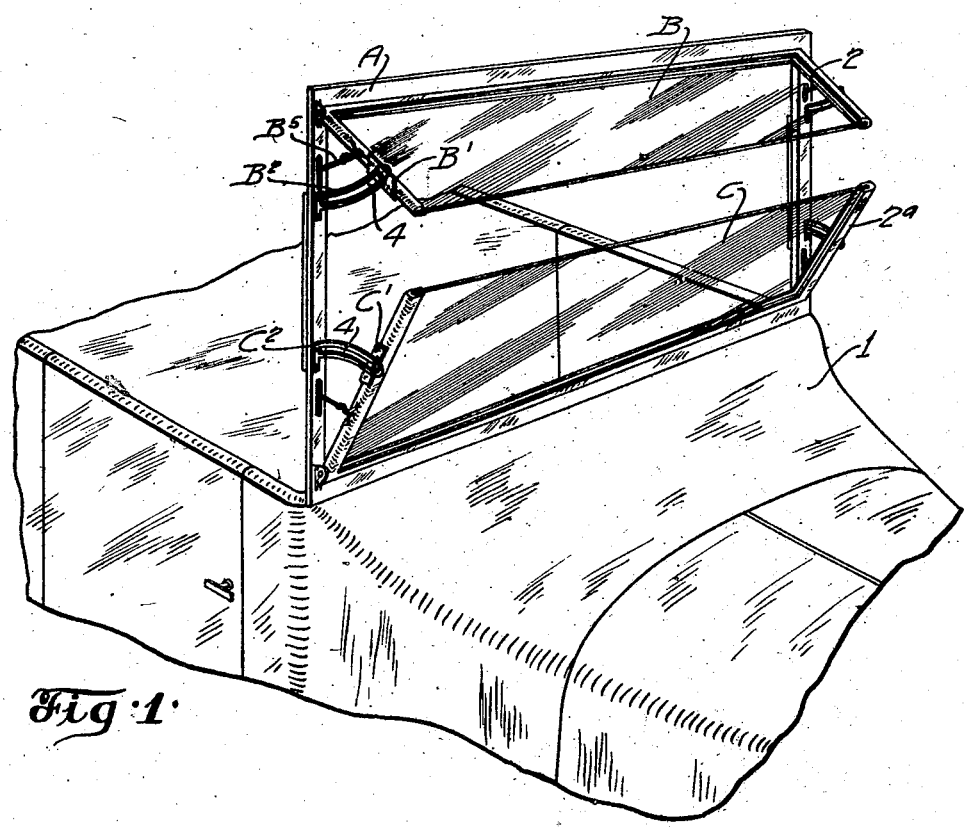

Figure 1 of the drawings is a perspective view of a portion of a vehicle body equipped with a wind shield constructed in accordance with my invention.

Figure 2:
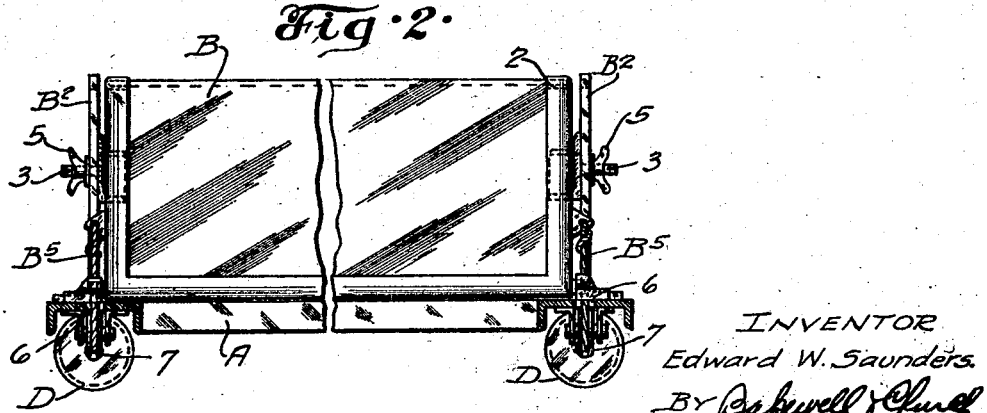

Figure 2 is a horizontal, transverse sectional view, taken on the line 2—2 of Figure 3, looking downwardly, and Figure 3 is a vertical sectional view of my improved wind shield.

Briefly stated, my broad idea consists of a wind shield comprising a supporting structure, and a transversely-disposed protecting means mounted on said supporting structure in such a way that it is normally held against rearward movement, but is capable of moving forwardly freely in the event a person located at the rear side of said means is thrown forwardly against the same. The transversely-disposed protecting means of the shield will usually be formed from one or more glass panels and the means that determines the normal position of said panel or panels and permits free forward movement of same may consist of stops or abutments arranged at the rear side of said panel or panels and springs or various other means that normally hold said panel or panels in engagement with said stops but which permit said panel or panels to move forwardly in the event they are subjected to a forward thrust, as previously described.

In the preferred form of my invention, as herein illustrated, the supporting structure of the shield is designated by the reference character A, and consists of a rigid frame that is mounted at the rear edge of the cowl 1 of a vehicle body. The protecting means of the shield is formed of two transversely-disposed glass panels B and C arranged in frames 2 and 2ª that are pivotally mounted on the supporting frame or structure in such a way that the top panel B can swing upwardly and forwardly and the bottom panel C can swing forwardly and downwardly. When it is desired to afford complete protection for the occupants of the vehicle located behind the shield said panels are arranged in an upright or vertical position with the meeting edges of said panels together, and when it is desired to ventilate the passenger compartment of the vehicle or produce a clear vision slot in the protecting means of the shield that affords an unobstructed view for the occupants in inclement weather, the panels B and C are swung forwardly into an inclined position, as shown in Figures 1 and 3.

I am aware of the fact that it is old to form the protecting means of a wind shield from two glass panels that can be arranged either in an upright position or in a forwardly-inclined position, but in the conventional vehicle wind shield of the kind referred to, and in fact, all prior wind shields with which I am familiar, the part of the shield that is used to protect the person located behind the shield is normally mounted in a rigid position, and accordingly, is apt to be shattered or broken if an occupant of the vehicle is thrown forwardly against same with considerable force. In my improved wind shield the protecting means of the shield, whether said means is formed by one panel or a plurality of panels, is mounted in such a way that it is held rigidly against rearward movement, but is capable of yielding or moving forwardly freely in the event it is subjected to a forward thrust of considerable force, as, for example, a thrust produced by the forward movement of a person's head or body against said means. In the embodiment of my invention herein illustrated the rearward movement of the panels B and C is prevented by stops B' and C' associated with the panels B and C, respectively, and arranged at the rear sides of the side pieces of the frames 2 and $2^a$ of said panels on arms $B^2$ and $C^2$ that project forwardly from the supporting structure A. Said stops are adjustably mounted on the arms that carry same in such a way that they can be arranged at the rear ends of said arms when it is desired to maintain the panels B and C in an upright position and arranged at intermediate points on said arms or on the outer ends of the arms when it is desired to maintain said panels in an inclined position. In the wind shield herein illustrated the stops B' and C' are provided with laterally-projecting bolts or threaded members 3 that are arranged in elongated slots 4 in the arms $B^2$ and $C^2$, and wing nuts 5 are mounted on said bolts so as to retain said stops in adjusted position, but it will, of course, be obvious that any other suitable means could be used for supporting the stops B' and C' and hold them in adjusted position without departing from the spirit of my invention.

The means that is used to hold the panels B and C in engagement with the stops B' and C' must be of such a character that it will hold said panels against said stops tightly enough to prevent said panels from vibrating or rattling, but will permit said panels to swing forwardly away from said stops in the event a person located at the rear side of said panels is thrown forwardly against the same. One means that I have found to be very efficient on account of its simplicity and low cost and because the pressure it exerts on said panels in a direction tending to hold them against their co-operating stops is increased automatically by the forward movement of said panels, consists of coiled expansion springs $B^3$ and $C^3$ combined with pistons or plungers $B^4$ and $C^4$ that are connected with cables $B^5$ and $C^5$ that are attached to the frames of the panels B and C. As shown in Figures 2 and 3, the springs $B^3$ are arranged in spring housings D on the rear side of the supporting structure A and are interposed between the upper end walls of said housings and the pistons $B^4$, and the cables or flexible elements $B^5$ lead rearwardly from the side pieces of the frame 2 of the top panel B through slots 6 in the supporting structure A, and thence downwardly over guide pulleys 7 to the pistons $B^4$. The springs $C^3$ that are associated with the bottom panel C are also arranged in the spring housings D and are interposed between the bottom end walls of said housings and the pistons 4, the cables or flexible elements $C^5$ that connect said pistons to the frame of the botom panel C leading rearwardly under guide pulleys $7^a$ and thence upwardly to the pistons $C^4$. In such a structure the tension of the springs $B^3$ and $C^3$ acting on the cables $B^5$ and $C^5$ normally holds the panels B and C tightly against the stops B' and C', and in view of the fact that said stops are arranged at the rear side of said panels and are clamped tightly to sationary portions on the supporting structure A, it will be impossible for either of said panels to swing rearwardly. In the event of an accident, however, tending to throw an occupant of the vehicle forwardly against the panels B and C, said panels will swing forwardly away from the stops B' and C', and thus prevent injury to the panels or to the person who strikes against same, the tension of the springs $B^3$ and $C^3$ being increased automatically as said panels continue to swing forwardly, and thus setting up a resistance that varies in proportion to the forward thrust or pressure exerted on the panels.

From the foregoing it will be seen that my improved wind shield presents practically the same appearance as the conventional wind shield and the panels of same can be adjusted in the same manner as the conventional wind shield, but it is a decided improvement on prior wind shields, in that the protecting means of same is always in a condition to move forwardly automatically in the event a person located at the rear side of the wind shield is thrown forwardly against said means with considerable force, thereby preventing said means from being shattered or cracked if it is constructed of glass, as is usually the case.

Having thus described my invention, what I claim as new and desire to secure by Letters Patent is:

1. A windshield, comprising a stationary supporting structure, transversely-disposed top and bottom glass panels pivotally mounted on said supporting structure, the pivots of the top panel being located adjacent the top edge of same and the pivots of the bottom panel being located adjacent the bottom edge of same, arms projecting forwardly from said supporting structure at the ends of said panels, stops adjustably mounted on said arms and arranged at the rear side of said panels, and a means for normally holding said panels against said stops, constructed so as to permit said panels to swing forwardly automatically under certain conditions.

2. A wind shield, comprising a supporting structure, a protecting member pivotally mounted on said supporting structure, a resilient means that normally exerts pressure on said protecting member in a direction tending to swing it rearwardly but which permits said protecting member to swing forwardly under certain conditions, and an adjustable means on said supporting structure that constitutes a stop or abutment against which said protecting member is normally held by the force of said resilient means.

3. A vehicle wind shield, comprising a rigid supporting structure, two transversely-disposed, transparent panels pivotally mounted directly on said supporting structure and adapted to be arranged in oppositely-inclined positions with their adjacent edges spaced apart, and a resilient means that normally holds said panels at rest either in a substantially vertical or forwardly-inclined position but which permits said panels to automatically swing forwardly under certain conditions.

4. A wind shield, comprising a pivotally mounted protecting member, an adjustable stop or abutment that is adapted to be set so as to hold said member in a substantially vertical or forwardly-inclined position and also prevent said member from swinging rearwardly, and a means for normally holding said member against said stop comprising a spring combined with a flexible device that is connected to said protecting member.

5. A wind shield, comprising a supporting structure, a protecting member pivotally mounted on said supporting structure, a spring housing on said supporting structure, a piston in said spring housing, a flexible element connected to said piston and to said protecting member, a guide on the supporting structure over which said flexible device passes, a spring that acts on said piston and exerts pressure on said protecting member in a direction tending to swing it rearwardly, and an adjustable stop for determining the position of said protecting member.

6. A vehicle wind shield, comprising a stationary supporting structure, transversely-disposed glass panels pivotally connected to said supporting structure in such a way that the top panel can swing forwardly and upwardly and the bottom panel can swing forwardly and downwardly, adjustable stops on said supporting structure arranged at the rear of said panels, a spring housing on said supporting structure, pistons in said housing, guide rollers on said supporting structure, cables connected to said pistons and to said panels and arranged to travel over said guide rollers, and springs in said housing arranged to exert pressure on said pistons in a direction to hold said panels against said stops.

7. A vehicle wind shield, comprising a stationary supporting structure, transversely-disposed top and bottom glass panels pivotally mounted on said supporting structure, the pivots of the top panel being located adjacent the top edge of same and the pivots of the bottom panel being located adjacent the bottom edge of same, arms projecting forwardly from said supporting structure at the ends of said panels, stops adjustably mounted on said arms and arranged adjacent the rear side of said panels, spring housings on said supporting structure, springs in said housings, and means combined with said springs for exerting pressure on said panels in a direction tending to draw them rearwardly and hold them tightly against said stops.

EDWARD W. SAUNDERS.